United States Patent [19]

Matsuzaki et al.

[11] 4,369,466

[45] Jan. 18, 1983

[54] VIDEO SIGNAL PROCESSING CIRCUIT

[75] Inventors: Atsushi Matsuzaki, Yokohama; Mitsuo Kawamata, Tokyo, both of Japan

[73] Assignee: Sony Corporation, Tokyo, Japan

[21] Appl. No.: 209,023

[22] Filed: Nov. 21, 1980

[30] Foreign Application Priority Data

Nov. 26, 1979 [JP] Japan .......................... 54-153194

[51] Int. Cl.$^3$ ............................................. H04N 5/16
[52] U.S. Cl. .................................. 358/170; 358/171; 358/172
[58] Field of Search ...................... 358/170, 171, 172

[56] References Cited

U.S. PATENT DOCUMENTS 3,970,777  7/1976  Bradford et al. ............. 358/170 X

*Primary Examiner*—Robert L. Richardson
*Attorney, Agent, or Firm*—Lewis H. Eslinger; Alvin Sinderbrand

[57] ABSTRACT

A video signal processing circuit for an input video signal having a DC level, a pedestal level, and a blanking period, includes a first clamp circuit for clamping the pedestal level of the input video signal to a first predetermined DC level in response to a clamp voltage supplied from a clamp voltage source, a blanking circuit for setting the level of the input video signal to a second predetermined DC level which is higher than the pedestal level of the input video signal during the blanking period of the input video signal and for producing a wave-formed signal, a peak-hold circuit for detecting and holding the darkest level of the wave-formed signal and for producing a peak-held signal, a series circuit of a diode and resistor, which produces a threshold level signal, connected between the first clamp circuit and the output of the peak-held circuit, a comparator circuit supplied at one input with the lower of the threshold level signal and the peak-held signal and supplied at another input with the output from the first clamp circuit for comparing the signals supplied thereto and for producing an output signal corresponding to the higher one of the compared signals, and an average picture level detecting circuit including a variable impedance element connected to the resistor for increasing the threshold level signal in response to increases in the average picture level of the input video signal.

7 Claims, 17 Drawing Figures

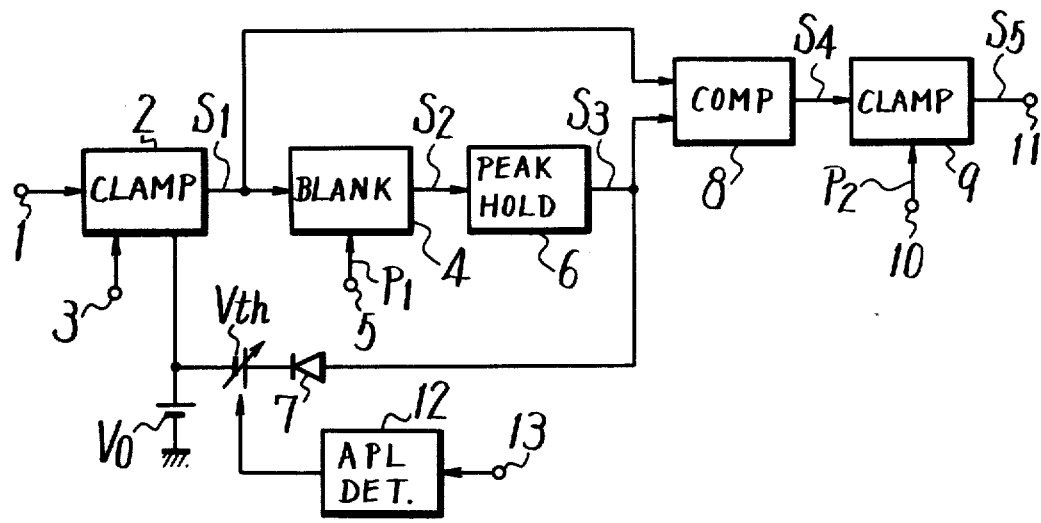
FIG. 4
FIG. 5A (S1)
FIG. 5B (P1)
FIG. 5C (S2)
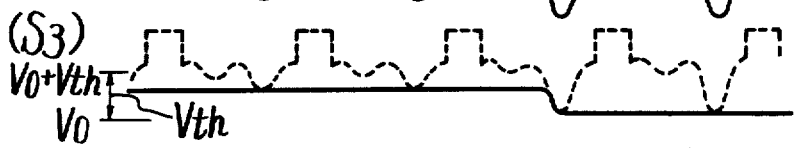
FIG. 5D (S3)
FIG. 5E (S4)
FIG. 5F (P2)
FIG. 5G (S5)

VIDEO SIGNAL PROCESSING CIRCUIT

BACKGROUND OF THE INVENTION

1. Field of the Invention

This invention relates generally to a video signal processing circuit and, more particularly, is directed to a video signal processing circuit for use in a television receiver.

2. Description of the Prior Art

When a video signal is applied to drive the cathode of a cathode ray tube, the level thereof is selected so that the picture screen of the cathode ray tube becomes darkest at the pedestal level $V_1$ of the video signal and brightest at the white level $V_2$ of the video signal, as shown in the graph of FIG. 1. This is accomplished by setting the cut-off level (black level) of the cathode ray tube equal to the pedestal level of the video signal, thus restoring the DC component thereof. In this situation, any change from station to station of the set-up level of the video signal, that is, the small difference between the pedestal level and the black signal level, is manifested as a change in the black signal level. The scattering or variation of set-up levels between stations (channels) appears as a scattering or variation of the black level. Therefore, when a broadcast signal of a certain station having a high set-up level is received, the black parts in the reproduced picture appear somewhat greyish. For this reason, in a practical embodiment of a television receiver, the DC transmission factor thereof is lowered to a value in the range of about 0.5 to 0.9 to reduce fluctuation of the black level caused by the scattering of the set-up level. However, the fluctuation of the black level cannot sufficiently be removed in this manner.

In order to solve the above problem, it has been proposed to detect the level of the video signal which is nearest to the black side and which is nearer to the black side than a predetermined level in a video period, to define this detected level as the black level and to set this detected level as the cut-off level of the cathode ray tube.

In other words, in such proposed system the level of the video signal nearest to the black side is defined as the black level such in a video period that the level of the video signal in one horizontal period which is nearest to the black side, as shown by the broken line in FIG. 2A, is detected, and the detected level, is lowered to the pedestal level as shown in FIG. 2B. However, according to the above signal processing system, a video signal having an APL (average picture level) which is relatively high, as shown in FIG. 3A, and having small level fluctuation, is converted into the video signal shown in FIG. 3B, which has an entirely different luminance or brightness level than that of the original video signal. Therefore, it has been proposed to define a predetermined level (for example, corresponding to 20% of the APL) of the video signal, as indicated by the one-dot chain line in FIG. 3A, as a threshold level Vth, and the level of the video signal at the side more black than the threshold level Vth is detected and only the detected signal portion is processed.

Even if the signal is processed according to the above proposal, problems may still occur. One problem occurs in the case where the set-up level is abnormally high, as shown by the broken line in FIG. 3C, that is, where the blackest level of the video signal is not low in comparison with the threshold level Vth. In such case, the reproduced picture generally becomes white, and accordingly, has a low contrast. In this case the reproduced picture is improved by lowering the level of the signal nearest to the black side to eliminate the set-up level. Another problem occurs in the case where the APL of the video signal is dark grey with approximately less than 10% variation and a pulsating signal of high level is included in the video signal, as shown in FIG. 3D. In this case, if the signal portion with a level lower than the threshold level Vth is lowered to the pedestal level, almost all of the reproduced picture becomes black with the result that bright signal information is reduced. This may be mistaken as a malfunctioning television receiver.

OBJECTS AND SUMMARY OF THE INVENTION

Accordingly, it is an object of the present invention to provide a novel video signal processing circuit that avoids the above-described difficulties encountered with the prior art.

More particularly, it is an object of the present invention to provide a video signal processing circuit in which the level of a video signal which is nearest to the black side and which is nearer to the black side than a predetermined level in a video period is detected, the detected level is defined as the black level and is made coincident with the cut-off level of the cathode ray tube, and also, the above predetermined level is varied in response to the APL of the video signal so as to be free from the defects inherent in the previously proposed system.

In accordance with an aspect of the present invention, a video signal processing circuit for an input video signal having a DC level, a pedestal level, and a blanking period, includes:

wave-forming means for setting the level of the input video signal to a first predetermined DC level, which is higher than the pedestal level of the input video signal, at least during the blanking period of the input video signal, and for producing a wave-formed signal;

peak-hold circuit for detecting and holding the darkest level of the wave-formed signal and for producing a peak-held signal; means for producing a threshold level signal;

black level control means adapted to be controlled by the peak-held signal for setting the DC level of the input video signal at such a level that the darkest level of the input video signal coincides with a second predetermined DC level only when the darkest level of the input video signal is less than the level of the threshold level signal; and means for varying the threshold level signal in response to the average picture level of the input video signal.

The above, and other, objects, features and advantages of the present invention will become apparent from the following detailed description of illustrative embodiments of the invention which is to be read in connection with the accompanying drawings.

BRIEF DESCRIPTION OF THE DRAWINGS

FIG. 4 is a block diagram of a video signal processing circuit according to one embodiment of the present invention;

FIGS. 5A to 5G are waveform diagrams used to explain the operation of the embodiment of the invention shown in FIG. 4;

DETAILED DESCRIPTION OF THE PREFERRED EMBODIMENTS

Figure 1:
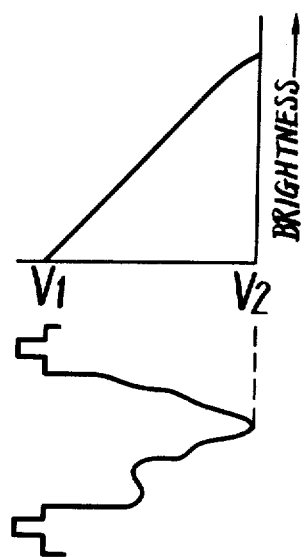
FIG. 1 is a graphical diagram used to explain the driving of a cathode ray tube by a video signal.
Figure 2A:
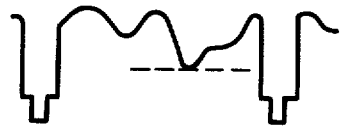
FIGS. 2A and 2B and FIGS. 3A to 3D, inclusive, are waveform diagrams used to explain the operation and advantages of the present invention.
Figure 2B:
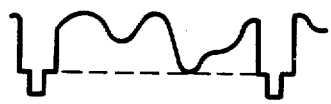

Referring to the drawings in detail, and initially to FIG. 4 thereof, there is shown a video signal processing circuit according to one embodiment of the present invention. In this embodiment of the invention, a video signal from a video detector circuit (not shown) is supplied through an input terminal 1 to a clamp circuit 2 which is also supplied with a clamp pulse through a terminal 3. Clamp circuit 2 produces a video signal S1 having its pedestal level clamped by the clamp pulse to a predetermined level or reference voltage $V_0$, as shown in FIG. 5A. The video signal S1 is fed to a blanking circuit 4 which is also supplied with a blanking pulse P1 (shown in FIG. 5B) through a terminal 5. Thus, the video signal S1 is blanked therein by the blanking pulse P1 over a range somewhat wider than the horizontal blanking period and the level of the video signal S1 in this blanked period is defined, for example, as zero potential. An output signal S2 is obtained from blanking circuit 4, as shown in FIG. 5C, and is fed to a peak-hold circuit (bottom-hold circuit) 6 which produces a peak-held output signal S3 corresponding to the peak level nearest to the black side in the video period as shown in FIG. 5D.

A voltage of $(V_0+V_{th})$ is applied to the output side of peak-hold circuit 6 through a diode 7, arranged in the forward biased direction from circuit 6 to the potential point (threshold level) of $(V_030 V_{th})$. If the forward voltage drop across diode 7 is neglected, when the peak-held output signal S3 has a level lower than the level $(V_0+V_{th})$, diode 7 is turned OFF so that the peak-held output signal S3 corresponds to the video signal. However, when the peak-held output signal S3 has a level higher than the threshold level $(V_0+V_{th})$, diode 7 is turned ON and the peak-held output signal S3 becomes equal to the threshold level $(V_0+V_{th})$.

The video signal S1 from clamp circuit 2 and the peak-held output signal S3 from peak-hold circuit 6 are supplied to a comparator circuit 8 which supplies the signal S1 or S3, whichever is nearer to the white level than the other, as a signal S4 shown in FIG. 5E. This signal S4 is fed to a clamp circuit 9 which is also supplied through a terminal 10 with a clamp pulse P2 shown in FIG. 5F. The clamp circuit 9 produces at its output terminal 11, a video signal S5, in which the level during blanking periods is fixed at a predetermined level, as shown in FIG. 5G.

The above described threshold level $V_{th}$ is varied in response to the output from an APL detecting circuit 12 which detects the APL of a video signal supplied thereto through a terminal 13 and controls the threshold level $V_{th}$ such that it is made high when the APL of the video signal is high and is made low when the APL of the video signal is low. If the pedestal level of the video signal is selected as 0% of the APL, when the APL is high, for example, higher than 80% of the white level, the level $V_{th}$ is made equal to about 35% of the APL. However, when the APL is low, for example, lower than 20% of the white level, the level $V_{th}$ is made equal to about 10% of the APL. In other words, the level $V_{th}$ varies within the range of about 10 to 35% of the APL.

Figure 3A:
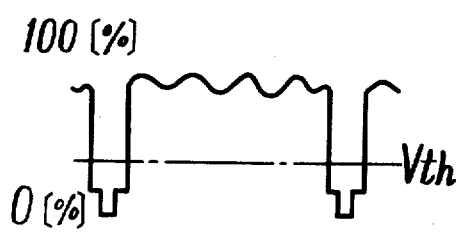
Figure 3B:

As described above, according to the invention, the level of the video signal which is nearer to the black side than the threshold level is detected, so as to avoid the problem where the level of the luminance of a reproduced picture is greatly lowered in comparison with that of the original signal, as shown in FIGS. 3A and 3B.

Figure 3C:
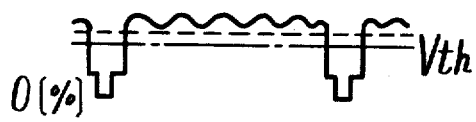

Further, even in the case where that the set-up level of a station is abnormally high, as shown in FIG. 3C, such that the black portions of a picture are on to the white side of the level $V_{th}$, the level $V_{th}$ is raised to effectively reduce the set-up level so as to increase the quality of a reproduced picture.

Figure 3D:
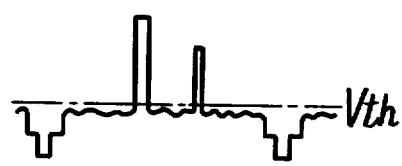

Further, in the case where the APL of a video signal is low and the level of the video signal corresponding to the background of a picture is lower than the level $V_{th}$, as shown in FIG. 3D, the level $V_{th}$ need not be lowered for the background of the picture to be black and there is no reduction of video information in the reproduced picture.

As set forth above, according to the invention, when the level of a video signal nearest to the black side is large, the APL of the video signal is high and when the APL is low, the level of the video signal nearest to the black side is also low, whereby the threshold level is varied in accordance with the APL level for suitably correcting the video signal.

Figure 6:
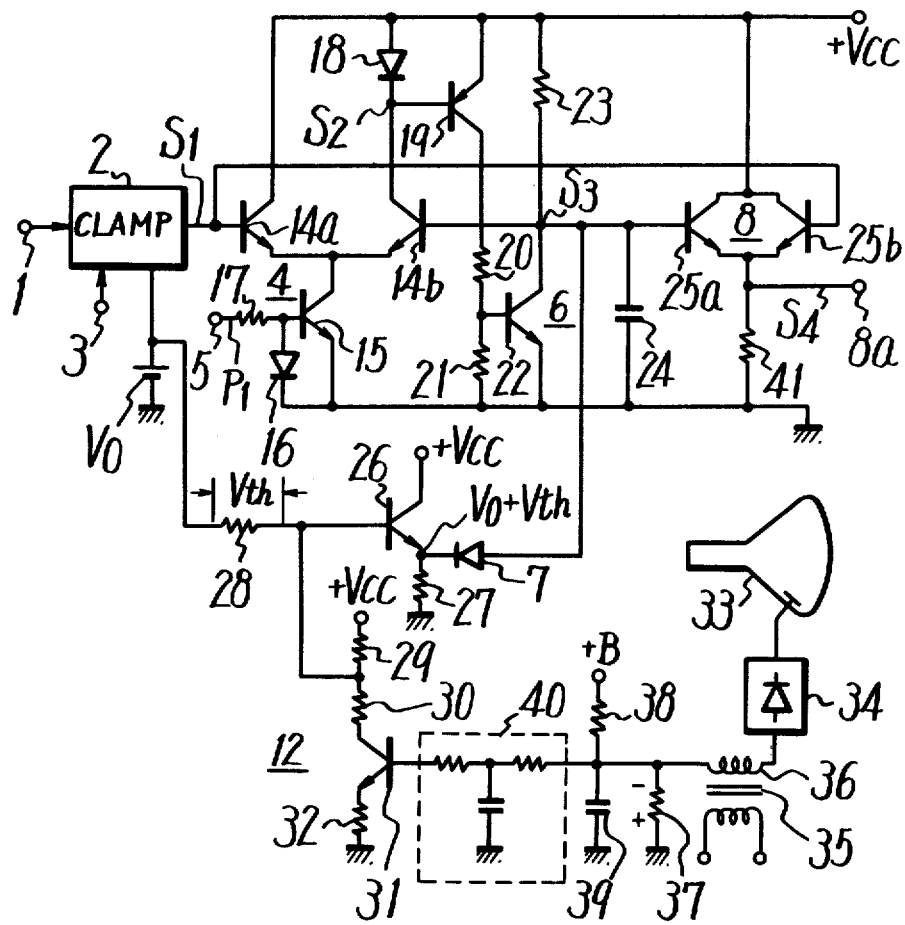
FIG. 6 is a circuit-wiring ion diagram showing a practical embodiment of the invention FIG. 4.

FIG. 6 shows details of a circuit for practicing the embodiment of the invention shown in FIG. 4. In this circuit, a pair of transistors 14a and 14b are provided at the output of clamp circuit 2 in which the emitters thereof are connected together to a constant current source which is formed of a transistor 15, a diode 16 and a resistor 17. The blanking pulse P1 is applied to terminal 5 which is connected to the base of transistor 15 through resistor 17. Thus, during the period within which transistor 15 is turned OFF by blanking pulse P1, the potential at the collector of transistor 14b is substantially at the power source voltage +Vcc. The collector output or output signal S2 of transistor 14b is derived through a current mirror circuit consisting of a diode 18 and a PNP-type transistor 19. Thus, blanking circuit 4 is formed by transistors 14a, 14b, 15, and 19, diodes 16 and 18, and resistor 17.

A series circuit of resistors 20 and 21 is connected between the collector of transistor 19 and ground potential, and the connection point between resistors 20 and 21 is connected to the base of an NPN-type transistor 22 which has its emitter gounded and its collector connected to the base of transistor 14b and also to the connection point between a resistor 23 and a capacitor 24. The series connection of resistor 23 and capacitor 24, which is connected between the power source terminal +Vcc and ground, with transistor 22, form peak-hold circuit 6.

When the base potential of transistor 14a is higher than that of transistor 14b, no current flows through diode 18 and transistors 19 and 22, and accordingly capacitor 24 is charged by the power source voltage through resistor 23, with the time constant of resistor 23 and capacitor 24 being selected very large. When the terminal voltage across capacitor 24 (the base potential of transistor 14b) exceeds the base potential of transistor 14a, current flows through diode 18 and transistors 19 and 22. Thus, capacitor 24 is discharged to lower its terminal voltage. In this manner, feedback is applied in such a way that the base potentials of transistors 14a and 14b become equal, so that the level of the video signal nearest to the black side in the video period is held and the held output S3, which appears at the collector of transistor 22, is fed to the base of a transistor 25a.

The connection point between resistor 23 and capacitor 24 is connected through diode 7 to the emitter of a transistor 26 and the emitter is, in turn, grounded through a resistor 27 having a large resistance value and forming a constant current source. The collector of transistor 26 is connected to the power source terminal +Vcc and its base is connected to the clamp voltage source $V_0$ through a resistor 28 and also to the connection point between resistors 29 and 30. The series connection of resistors 29 and 30 is connected between the power source terminal +Vcc and the collector of a transistor 31 which has the emitter thereof grounded through a resistor 32. When the voltage drop across resistor 28 is added to the clamp voltage $V_0$, the emitter of transistor 26 effectively is at the threshold level $(V_0+Vth)$.

The base potential of transistor 31 is varied by the APL of a video signal. In the circuit of FIG. 6, the APL is not detected directly, but instead, the average value of the beam current in a cathode ray tube 33 is detected. More particularly, the high voltage produced by a high voltage generating circuit 34 is applied to the anode of the cathode ray tube 33. The high voltage generating circuit 34 is connected to a fly-back transformer 35 at its secondary winding 36. Between one end of secondary winding 36 and ground is connected a resistor 37 across which a voltage drop is generated, with the polarities, thereof as marked in FIG. 6, in response to the beam current in cathode ray tube 33. The connection point between a series circuit of a resistor 38 and a capacitor 39, which series circuit is connected between a voltage source +B and ground, is connected to the connection point between the secondary winding 36 and resistor 37 to apply a positive bias voltage thereto. Thus, at the connection point between resistor 38 and capacitor 39 is produced a voltage the level of which is low when the beam current is large. This voltage is applied to an integrating circuit 40, shown by the broken line block, and the average value of the voltage from integrating circuit 40 is applied to the base of transistor 31 which serves. When a variable impedance element. As the average value of the beam current is high, the output from integrating circuit 40 is small so that the impedance between the collector and emitter of transistor 31 becomes large, the potential at the connection point between the resistors 29 and 30 becomes high, and the threshold level $(V_0+Vth)$ appearing at the emitter of transistor 26 is changed to a high level. Thus, APL detecting circuit 12 is so formed.

It is, however, possible that, instead of continuously varying the threshold level $(V_0+Vth)$, this threshold level is varied in a stepwise manner by using a switching element.

In the circuit according to this invention, shown in FIG. 6, there is provided a transistor 25b having a collector and emitter which are connected to the collector and emitter of transistor 25a, respectively. The connection point between the collectors of both transistors 25a and 25b is connected to the power source terminal +Vcc, and the connection point between the emitters thereof is grounded through a resistor 41 and is connected to an output terminal 8a. The transistors 25a and 25b form comparator circuit 8. Thus, the video signal S1 from clamp circuit 2 is applied to the base of transistor 25b and either the video signal S1 or the peak held output signal S3, whichever has a higher level than the other, is delivered to output terminal 8a from comparator circuit 8, as the output signal S4.

A feedback clamp circuit or the like (not shown), which is known in the art, may be used as clamp circuit 9 and is connected to output terminal 8a.

Figure 7:
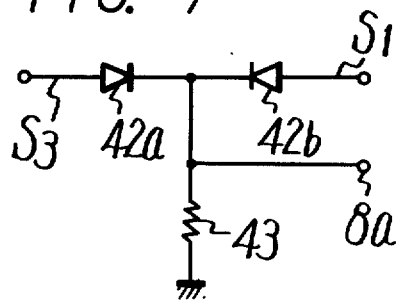
FIG. 7 is a circuit wiring diagram showing another embodiment of a comparator circuit which can be used in the circuit of FIG. 6.

Turning now to FIG. 7, another embodiment of comparator circuit 8 which can be used with the present invention will now be described. In this embodiment, two diodes 42a and 42b are provided with their anodes respectively supplied with the signals S3 and S1 and with their cathodes connected together to ground through a resistor 43 and also to output terminal 8a of comparator circuit 8 (refer to FIG. 6).

As will be understood from the above description, according to the present invention, fluctuation of the black level caused by scattering or variations of the set-up level can be eliminated along with the problem of the luminance level of the video signal greatly differing from that of the original video signal. Thus, the problem of the background of a reproduced picture becoming too dark can be avoided.

It should be appreciated that the present invention cannot only be applied to a television receiver but also with respect to the output from a television camera with the same effect. In other words, the above signal processing operation can be carried out so that the level of the output signal from the television camera which is nearest to the black side and nearer to the black side than a predetermined level, is detected and held, and the held level is made coincident with the set-up level.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. A video signal processing circuit for an input video signal having a DC level, a pedestal level, and a blanking period, comprising:

means for setting the level of said input video signal to a first predetermined DC level, which is higher than said pedestal level of said input video signal, at least during said blanking period of said input video signal, and for producing a first signal in response thereto;

means for detecting and holding the darkest level of said first signal and for producing a second signal in response thereto;

means for producing a threshold level signal;

black level control means adapted to be controlled by said second signal for setting the DC level of said input video signal at a level such that the darkest level of said input video signal coincides with a second predetermined DC level only when the darkest level of said input video signal is less than the level of said threshold level signal; and means for varying said threshold level signal in response to the average picture level of said input video signal.

2. A video signal processing circuit for an input video signal having a DC level, a pedestal level, and a blanking period, comprising:

a clamp voltage source for supplying a signal having a first predetermined level;

first clamp means for clamping the pedestal level of said input video signal to said first predetermined DC level to produce an output signal;

means for setting the level of said input video signal to a second predetermined DC level, which is higher than said pedestal level of said input video signal, at least during said blanking period of said input video signal, and for producing a first signal in response thereto;

means for detecting and holding the darkest level of said first signal and for producing a second signal in response thereto;

a threshold voltage source and a diode connected in series between said means for detecting and said clamp voltage source;

comparator means for comparing the output signal of said first clamp means with said second signal from said means for detecting, and for producing an output signal corresponding to the higher one of said compared signals;

second clamp means for clamping the output signal of said comparator means; and average picture level detecting means for varying the voltage of said threshold voltage source in response to the average picture level of the input video signal.

3. The circuit according to claim 1; further including a cathode ray tube to which a beam current is supplied, and in which said means for varying includes voltage generating means for generating a voltage having a level corresponding to the level of said beam current, averaging means for producing an averaging signal corresponding to the average value of said generated voltage, and variable impedance means having a variable impedance controlled by said averaging signal such that variations of said variable impedance results in variation of said threshold level signal.

4. The circuit according to claim 3; in which said averaging means includes an integrating circuit supplied with said generated voltage and producing an integrated output signal as said averaging signal in response thereto, and said variable impedance means includes a transistor having a collector-emitter path connected between a reference potential and said means for producing a threshold level signal and having a base supplied with said integrated output signal.

5. The circuit according to claim 4; in which said variable impedance means further includes first and second resistors connected in series between the collector of said transistor and a second reference potential, and the connection point between said first and second resistors is connected to said means for producing a threshold level signal, wherein the level of said integrated output signal decreases with increasing levels of the beam current so as to increase the impedance between the collector and emitter of the transistor which, in turn, increases the level of the threshold level signal.

6. The circuit according to claim 5; further including a clamp voltage source for supplying a signal having a third predetermined DC level, and clamp means for clamping the pedestal level of said input video signal to said third predetermined DC level and for supplying said input video signal having its pedestal level clamped to said third predetermined level to said means for setting; and in which said means for producing a threshold level signal includes a resistive element connected between said clamp voltage source and both of the connection point between said first and second resistors and the output of said means for detecting.

7. The circuit according to claim 1; further including a clamp voltage source for supplying a signal having a third predetermined DC level, and clamp means for clamping the pedestal level of said input video signal to said third predetermined DC level and for supplying said input video signal having its pedestal level clamped to said third said third predetermined level to said means for setting; and in which said means for producing a threshold level signal includes a resistive element connected between said clamp voltage source and both of said means for varying and the output of said means for detecting.

* * * * *